(12) United States Patent
Han

(10) Patent No.: US 8,972,791 B2
(45) Date of Patent: Mar. 3, 2015

(54) MANAGING CODE-TRACING DATA

(75) Inventor: Richard Han, Angus (GB)

(73) Assignee: NCR Corporation, Duluth, GA (US)

( * ) Notice: Subject to any disclaimer, the term of this patent is extended or adjusted under 35 U.S.C. 154(b) by 264 days.

(21) Appl. No.: 13/362,751

(22) Filed: Jan. 31, 2012

(65) Prior Publication Data

US 2013/0198572 A1 Aug. 1, 2013

(51) Int. Cl.
*G06F 11/00* (2006.01)
(52) U.S. Cl.
USPC ................... 714/38.1; 714/45; 714/48
(58) Field of Classification Search
USPC ............................ 714/38.1, 45, 48
See application file for complete search history.

(56) References Cited

U.S. PATENT DOCUMENTS

| | | | | |
|---|---|---|---|---|
| 6,934,891 B2* | 8/2005 | Kawaguchi et al. | ............ | 714/48 |
| 7,975,179 B2* | 7/2011 | Chandrasekaran | .......... | 714/38.1 |
| 7,987,390 B2* | 7/2011 | Chandrasekaran | .......... | 714/38.1 |
| 8,140,911 B2* | 3/2012 | Borghetti et al. | ............. | 714/45 |
| 2004/0128658 A1* | 7/2004 | Lueh et al. | ..................... | 717/151 |
| 2005/0131822 A1* | 6/2005 | Gardner | ......................... | 705/43 |
| 2008/0155353 A1* | 6/2008 | Craske | ........................... | 714/45 |
| 2008/0244328 A1* | 10/2008 | Bohizic et al. | .................. | 714/45 |
| 2008/0307266 A1* | 12/2008 | Chandrasekaran | ............ | 714/38 |
| 2009/0119548 A1* | 5/2009 | Kollmann et al. | ............. | 714/45 |
| 2011/0289360 A1* | 11/2011 | Cathro | ............................. | 714/45 |

* cited by examiner

*Primary Examiner* — Charles Ehne
(74) *Attorney, Agent, or Firm* — Paul W. Martin

(57) ABSTRACT

A method of managing code-tracing data in a target program is described. The method comprises the steps of: identifying when an exception occurs in the target program; accessing a stack trace of a call stack to identify a module in the target program that threw the exception; and activating code-tracing at a high detail level in that module.

12 Claims, 2 Drawing Sheets

MANAGING CODE-TRACING DATA

FIELD OF INVENTION

The present invention relates to managing code-tracing data.

BACKGROUND OF INVENTION

To improve fault detection in software, software engineers typically add instrumentation code to software components (application software, drivers, and the like) so that code-tracing data is generated automatically by the instrumentation code as the software components execute. The instrumentation code typically generates code-tracing data when certain functions are performed, status changes occur, and the like. A trace manager is used to store the code-tracing data generated by the instrumentation code in a log file.

If a fault occurs, then the log file can be analyzed to identify the cause of the fault. For example, the code-tracing data may indicate if any unexpected events occurred, or if any expected events did not occur, prior to the fault occurring.

Although generating and storing code-tracing data has clear advantages, there are also problems associated with managing code-tracing data.

One problem is that instrumentation code can produce a large amount of code-tracing data every second, which consumes valuable storage space and may slow down the operation of the software as the log file is written to disk. Furthermore, the large quantity of code-tracing data produced makes it difficult to identify the code-tracing data that is relevant to an error. Other errors may be detected that are irrelevant to, and may obscure, the error being targeted.

It would be advantageous to overcome or mitigate some of these disadvantages, or other disadvantages associated with managing code-tracing data.

SUMMARY OF INVENTION

Accordingly, the invention generally provides methods, systems, apparatus, and software for managing code-tracing data.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of managing code-tracing data in a target program, the method comprises the steps of:

identifying when an exception occurs in the target program;

accessing a stack trace of a call stack to identify a module in the target program that threw the exception; and activating code-tracing at a high detail level in that module.

The method may comprise the further steps of: accessing the stack trace to identify a module (the first calling module) in the target program that called the module that threw the exception (the exception module); and activating code-tracing at a medium detail level in that first calling module.

The method may comprise the further steps of: accessing the stack trace to identify a module (the second calling module) in the target program that called the first calling module; and activating code-tracing at a low detail level in that second calling module.

The method may comprise the further step of: activating code-tracing at a minimal detail level in the rest of the target program (other than the modules listed above).

The method may comprise the further step of: identifying modules (the called modules) called by the module in the target program that threw the exception (the exception module); and activating code-tracing at a medium detail level in those called modules. The called modules may have caused the exception by returning invalid data to the exception module.

The step of identifying the called modules may be implemented using a call identification module that analyses the exception module.

The method may comprise the additional step of accessing a code-tracing map that indicates what code-tracing settings should be activated if an exception occurs in a specified module.

The method may comprise the additional step of returning the code-tracing levels to a default value (for example, a low detail level) after a time period expires with no exception being thrown. This ensures that computationally intensive code-tracing is not applied if no exceptions are being thrown. In other words, it avoids the target program being slowed down by detailed code-tracing if no exceptions are occurring.

The method may comprise the additional step of decreasing the code-tracing levels over time if no exception is thrown. The code-tracing levels may be decreased until a default value (for example, a low detail level) is reached.

The method may comprise the additional step of increasing the code-tracing levels over time if an exception is thrown within a preset time period of restarting the target program.

The target program may be an application (such as a control application), drivers, or any other type of software.

The method may comprise the further step of restarting the target program, either before the first step or after the last step.

As is known to those of skill in the art, an "exception" is a special condition that changes the normal flow of the target program execution, causing it to branch to a different routine. When an exception is "thrown" it will travel through the layers of code in the target program until it is dealt with. If the target program does not "catch" the exception, for example, because the programmer did not write a module to handle that particular exception, then the exception makes its way to the top layer of the target program and the operating system recognizes it as an "unhandled exception" and shuts down the target program, resulting in a fatal exception error.

As is known to those of skill in the art, a "call stack" is a data structure that stores information about the active modules of a target program. A call stack is used to keep track of the point to which each active module should return control when it finishes executing. Modules may be nested within the call stack. In other words, one module may call another module before returning control to the main program. When there is an unhandled exception, the call stack stores the A stack trace is a report of the call stack at a certain point in time during the execution of the target program. When an unhandled exception occurs, the stack trace includes details of all of the active modules, including the module that threw the exception.

By virtue of this aspect, the level (or detail) of code-tracing that is activated is dependent on the proximity of the module to the module that threw the exception. This has the advantage that the operation of the target program is not adversely impacted by an undue amount; however, detailed code-tracing is provided in proximity to where the exception was thrown, thereby maximizing the possibility of detecting what caused the exception if it occurs again.

According to a second aspect there is provided a system for managing code-tracing data in a target program, the system comprising:

a trace manager arranged to: (i) identify when an exception occurs in the target program; (ii) access a stack trace of a call stack to identify a module in the target program that threw the exception; and (iii) activate code-tracing at a high detail level in that module.

The trace manager may be further arranged to: (iv) access the stack trace to identify a module (the first calling module) in the target program that called the module that threw the exception; and (v) activate code-tracing at a medium detail level in that first calling module.

The trace manager may be further arranged to: (vi) access the stack trace to identify a module (the second calling module) in the target program that called the first calling module; and (vii) activate code-tracing at a low detail level in that second calling module.

The trace manager may be further arranged to: (viii) activate code-tracing at a minimal detail level in the rest of the target program (other than the modules listed above).

The trace manager may comprise a software component.

The trace manager may be implemented by a CEN XFS compliant software component. Alternatively, the trace manager may be implemented by a proprietary code-tracing component.

The executing software component that transmits code-tracing data may comprise an XFS service provider.

According to a third aspect there is provided a computer program comprising program instructions for executing the steps of the first aspect.

The computer program may be stored on a computer readable medium, such as a computer memory, an input/output data storage device (such as a magnetic or optical disk, or a Flash storage drive) or the like.

According to a fourth aspect there is provided a computer data signal embodied on a carrier wave encoding instructions that, when executed on a processor, implement the method of the first aspect.

According to a fifth aspect there is provided a self-service terminal comprising a plurality of modules for providing transaction-related functions to a customer of the self-service terminal, and a controller coupled to the modules, and executing a runtime platform including a trace manager, the trace manager being arranged to: (i) identify when an exception occurs in the target program; (ii) access a stack trace of a call stack to identify a module in the target program that threw the exception; and (iii) activate code-tracing at a high detail level in that module.

The self-service terminal may comprise an automated teller machine (ATM).

According to a sixth aspect there is provided a method of managing code-tracing data in a target program, the method comprises the steps of:

identifying when an exception occurs in the target program;

accessing a stack trace of a call stack to identify a module in the target program that threw the exception; and activating code-tracing at a more detailed level in that module.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
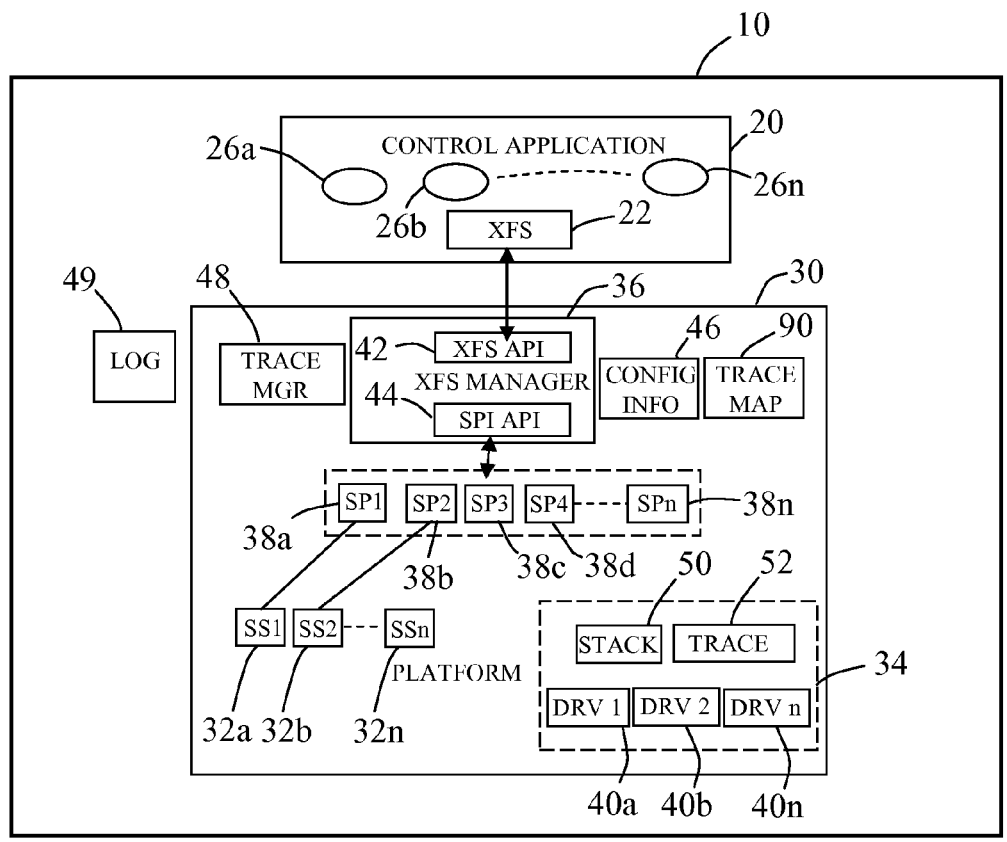
FIG. 1 is a simplified schematic diagram of an SST memory executing software components, including a control application and a target program, according to an embodiment of the present invention.

Reference will now be made to FIG. 1, which is a simplified schematic diagram showing an SST memory 10 executing software components. In this embodiment the SST is an ATM. The software components comprise: a control application 20 and a runtime platform 30 (which includes the target program).

The Control Application 20

As is known in the art, the control application 20 presents a sequence of screens on an ATM display to a customer at the ATM, collates information from the customer (for example, customer account information from a customer's ATM card, a transaction request from the customer's selection, and the like), obtains authorization for a transaction request from a remote authorization host (not shown), and instructs modules within the ATM, as needed, to fulfill an authorized transaction.

As is also known in the art, the control application 20 also comprises a conventional CEN XFS interface 22 for communicating with an XFS manager (described as box 36 below) in the runtime platform 30. CEN is the European Committee for Standardisation, and XFS is the eXtensions for Financial Services standard. The current version of this CEN XFS standard is v.3.10.

The XFS manager 36 provides services to clients (applications or threads of applications).

The control application 20 is capable of creating and maintaining multiple sessions, as illustrated by ellipses 26a,b, n.

The Runtime Platform 30

The runtime platform 30 comprises proprietary device drivers, 32a,b, . . . n (only three of which are illustrated), an operating system 34, the XFS manager 36, and XFS service providers 38a,b,c,d . . . n.

In this embodiment, the operating system 34 is a Windows XP (trade mark) operating system, available from Microsoft Corporation (trade mark). The operating system 34 includes a plurality of standard device drivers 40a,b, . . . n for interfacing with standard computing devices such as a magnetic disk drive, a display, USB ports, serial ports, a parallel port, and such like. As is well known in the art, the operating system 34 is responsible for memory, process, task, and disk management, and includes routines for implementing these functions.

The proprietary device drivers 32 are a set of APTRA (trade mark) XFS components, available from NCR Corporation, 3097 Satellite Blvd., Duluth, Ga. 30096, U.S.A. The device drivers 32 provide a range of programming facilities specific to self-service terminal devices and services. Similar proprietary device drivers are available from other ATM vendors.

One function of the device drivers 32 is to enhance the operating system 34 so that the operating system 34 and device drivers 32 together provide high level access to all of the devices and modules, including both standard home computing devices (via the operating system 34), and XFS computing devices (via the run-time components 32). Thus, the combination of the device drivers 32 and the operating system 34 can be viewed as providing a complete ATM operating system.

The service providers 38 provide the control application 20 (and other applications, such as management applications (not shown)) with a vendor-independent interface to the device drivers 32,40.

The device drivers 32 interface with self-service specific devices, and include support files (not shown), to allow each device or module to be operated, tested, maintained, and configured. Although only a few device drivers 32a,b are shown, there are many device drivers 32, one for each self-service specific module, such as a card reader (not shown), a receipt printer (not shown), an encrypting keypad (not shown) and FDKs (not shown), and a cash dispenser (not shown). Furthermore, there are many more devices and modules in an ATM than those described herein, for example there are more standard computing devices such as USB ports and a parallel port, there may also be more self-service devices and modules, such as a statement printer, a cash accept module, and the like. These devices and modules are not discussed herein because they are not essential to an understanding of the invention.

The XFS manager 36 includes an XFS application programming interface (API) 42 and a service provider interface (SPI) 44.

The runtime platform 30 also includes configuration data 46 and a trace manager component 48. The trace manager component 48 can write a log file 49 (illustrated in memory 10) onto permanent I/O storage within the ATM (not shown).

The service providers 38 communicate with the XFS manager 36 and also with the self-service device drivers 32 and the standard device drivers 40 associated with the modules. Suitable service providers are available from NCR Corporation, 3097 Satellite Blvd., Duluth, Ga. 30096, U.S.A.

The service providers 38 provide a high level of abstraction to allow the control application 20 to issue standard XFS commands to request functions and services. The service providers 38 translate these XFS commands for the particular device drivers 32,40 used in the runtime platform 30. Each service provider 38 is typically associated with one module (such as a cash dispenser module).

Each of the multiple sessions 26 is capable of initiating and maintaining independent communication with the same service provider 38.

The operating system 34 also includes a call stack 50, and a stack trace 52, where the stack trace represents the current contents of the call stack 50.

Figure 2:
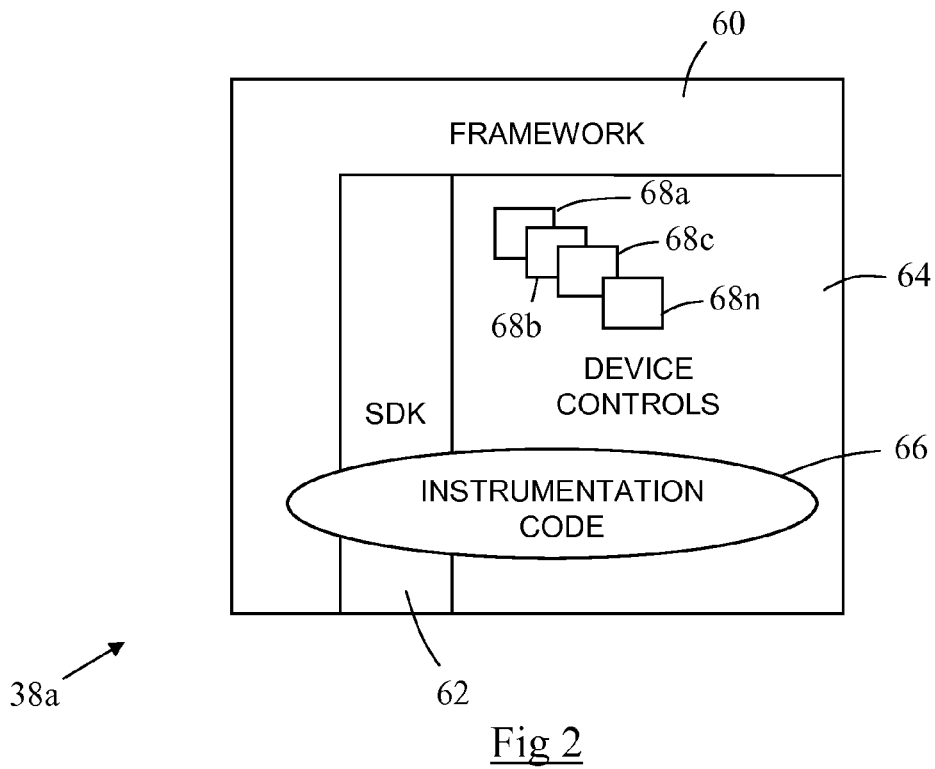
FIG. 2 is a simplified schematic diagram illustrating one of the software components of the target program (a service provider) executing in the SST memory of FIG. 1.

Reference will now be made to FIG. 2, which is a block diagram illustrating one of the service providers 38a in more detail. In this embodiment, service provider 38a is associated with a cash dispenser.

The cash dispenser service provider 38a comprises a framework portion 60 (which is identical for all of the service providers 38), a software development kit (SDK) portion 62 (which is also identical for all service providers 38), and a device control portion 64. The cash dispenser service provider 38a is a component (according to the terminology used herein), and the framework portion 60, SDK portion 62, and device control portion 64, are all objects (according to the terminology used herein). As is known in the art, when each of these objects registers with the XFS manager 36, each object provides the XFS manager 36 with a reference. This reference identifies the object to the XFS manager 36.

The framework portion 60 provides the code necessary to handle communications in XFS format.

The SDK portion 62 provides a set of application programming interfaces (APIs) between the framework portion 60 and the device control portion 64. The SDK portion 62 ensures that the device control portion 64 is implemented to a specific contract so that the device control portion 64 operates in unison with the framework portion 60.

The device control portion 64 is unique for each service provider 38 and includes device driver functionality for the device associated with that service provider 38. The device control portion 64 also includes function-implementing code 68a,b,c, . . . n.

The function-implementing code 68 is illustrated as a plurality of individual boxes. This is merely to illustrate that there is code within the service provider 38a providing discrete functions implemented by the cash dispenser.

The framework portion 60, the SDK portion 62, and the device control portion 64 all include instrumentation code 66, which is illustrated in FIG. 2 as an ellipse.

In this embodiment, function-implementing code 68a implements a banknote dispense function and function-implementing code 68b implements a banknote retract function.

The instrumentation code 66 provides checkpoints, trace lines, and other diagnosis tools. Whenever one of the functions (for example, the banknote dispense function 68a) is called, then a trace line in the instrumentation code 66 for that function creates data to indicate (i) the client thread that called the function, (ii) when the function was called, (iii) the name of the function called, and (iv) the names and values of the parameters input to the function, and output from the function.

The service provider 38a creates a code-tracing object populated with (i) the created data, (ii) the reference identifying the object (for example, the device control portion 64) incorporating the trace line in the instrumentation code 66 that created the code-tracing object, and (iii) a category for the created data.

The reference is included so that the code-tracing object identifies the function that caused the code-tracing object to be created; or more accurately, the function containing the instrumentation code that created the code-tracing object).

The category indicates what type of data is included in the code-tracing object. For example, the category may be one of the following: entry point, exit point, general data, information, warning, or error. The category is created automatically based on the type of instrumentation code that created the data.

The category is a property of the code-tracing object. The reference is also a property of the code-tracing object.

The service provider 38a pushes this created code-tracing object (which contains code-tracing data) to the XFS manager 36 using a conventional XFS command (WFMOutputTraceData).

The trace manager component 48 is responsible for assigning a trace level to each module (or function) that is executing. There are many different possible levels that can be assigned. For simplicity, these will be referred to herein as high detail level, medium detail level, and low detail level.

Each session 26 can request the XFS manager 36 to store the code-tracing data (which is data extracted from the code-tracing object) in the log file 49 using either the WFSSetTraceLevel XFS API call or when a session is opened with the service provider 38a. However, in this embodiment, the sessions 26 let the trace manager component 48 assign the level of code tracing that will be used. In other words, the sessions 26 do not request the XFS manager 36 to save the code-tracing data in this embodiment.

The configuration information 46 stores the name and path of this log file, which by default is "xfstrace.log".

Figure 3:
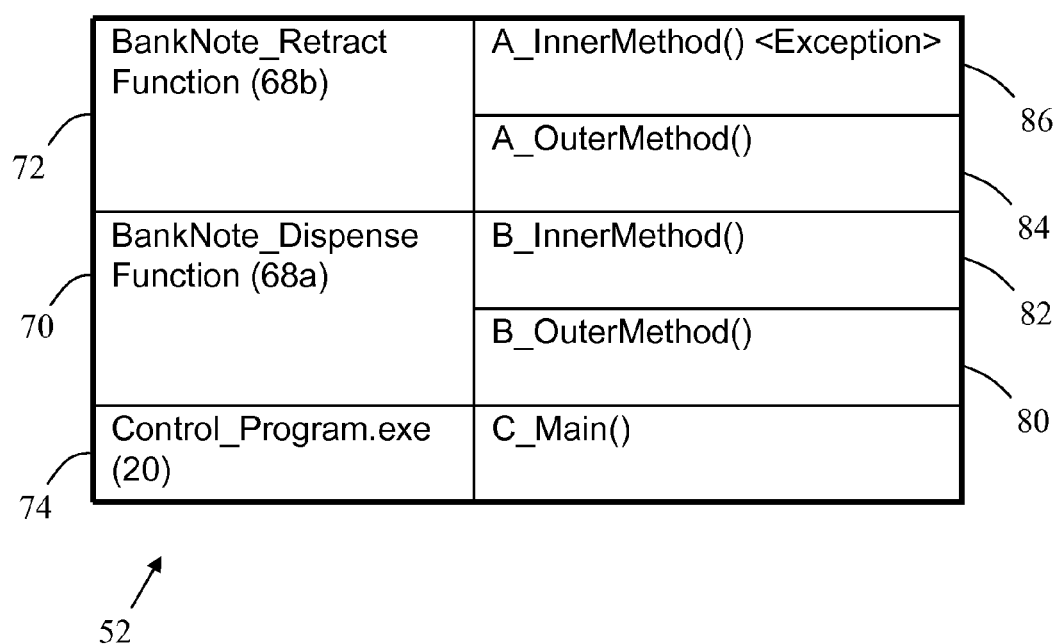
FIG. 3 is a pictorial diagram of a software stack trace illustrating entries for two modules and the control application.

Reference will now also be made to FIG. 3, which is a pictorial diagram of the software stack trace 52 illustrating entries 70,72 for two modules (the banknote dispense function 68a and the banknote retract function 68b) and an entry 74 for a session 26 in the control application 20.

When one of the functions (for example, the banknote dispense function 68a) is called, the XFS manager 36 passes information to the call stack 50 about which function (or module) made the call, and which function was called. The call stack 50 stores this information, together with a pointer that points to the portion of the calling function that made the call.

The stack trace 52 illustrates the order in which the functions were called. In this example, the session 26 in the control application 20 called the banknote dispense function 68a to dispense banknotes to a customer. As can be seen from entry 70, an outer method 80 was called first, which then called an inner method 82. The inner method 82 in the banknote dispense function 68a then called the banknote retract function 68b (because the customer did not remove the presented banknotes). The banknote retract function 68b also has an outer method 84, which calls an inner method 86. This inner method 86 threw an exception that could not be handled, causing the control application 20 to have to reboot the ATM (after saving the stack trace 52 in non-volatile memory (not shown)).

Once the ATM is booted up, and the control application 20 is loaded, the XFS manager 36 accesses the stack trace 52 (in the non-volatile memory). In particular, the trace manager 48 accesses the stack trace 52 to ascertain the module (in this example, the function) that threw the exception. In this example, it was the banknote retract function 68b that threw the exception. The trace manager 48 then sets the code-tracing level for that function 68b to a high detail level.

The trace manager 48 also ascertains from the stack trace 52 which function called the banknote retract function 68b (in this example, it was the banknote dispense function 68a). The trace manager 48 then sets the code-tracing level for that function 68a to a medium detail level.

The trace manager 48 also ascertains from the stack trace 52 which module or function called the banknote dispense function 68a (in this example, it was a session from the control application 20). The trace manager 48 then sets the code-tracing level for control application 20 (if it exists) to a low detail level.

The trace manager 48 maintains a timer to measure how long has elapsed since the exception was thrown. The trace manager 48 may then increment the detail level of code-tracing if an unhandled exception is thrown by the same function (in this example, banknote retract function 68b) prior to expiry of a preset time limit; or decrement the detail level of code-tracing if an unhandled exception is not thrown prior to expiry of a preset time limit.

The trace manager 48, or some additional code (such as a call identification module), may be used to analyze the function that threw the exception (the banknote retract function 68b) to ascertain if that function called any other functions. The trace manager 48 may then assign a medium or high detail level of code-tracing to any functions called by the banknote retract function 68b. This has the advantage of being able to log events occurring in functions called by the function that threw the exception. These functions would not be stored in the stack trace 52, and may have contributed to or caused the exception (for example, by returning invalid data). The reason that they would not be stored in the call stack is that they have already executed and returned data, so they would have been removed from the call stack by the operating system 34 prior to the exception occurring.

The trace manager 48 may also access a code-tracing map 90 (which is an optional component in the runtime platform 30) (FIG. 2). The code-tracing map 90 indicates what code-tracing settings should be activated if an exception occurs in a specified function. Any information provided in this code-tracing map 90 is used in preference to the general detail level settings (such as medium detail level, high detail level). The code-tracing map 90 allows specific information to be stored if a known type of exception is common in a particular function. This specific information may be relevant to the common type of exception, thereby facilitating subsequent debugging.

It will now be appreciated that the above embodiment has the advantage that code-tracing is increased in those modules that are closest to where the exception occurred. This minimizes the impact of code-tracing on operational performance of the system, but still provides useful information for debugging purposes.

Various modifications may be made to the above described embodiment within the scope of the invention, for example, in other embodiments, the SST may not implement the CEN XFS standard. In such embodiments, a proprietary trace manager may be provided.

In other embodiments, the self-service terminal may be an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

In the above embodiment, the software components including instrumentation code comprise service providers. In other embodiments, the software components including instrumentation code may comprise applications executing in the environment of an operating system and/or a runtime platform.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A method of managing code-tracing data in a target program, the method comprises the steps of:
    identifying when an exception occurs in the target program;
    accessing a stack trace of a call stack to identify a module in the target program that threw the exception;
    assigning a level of code tracing in that module including activating code-tracing at a high detail level in that module; and
    returning the code-tracing levels to a default value after a time period expires with no exception being thrown.

2. A method according to claim 1, wherein the method comprises the further steps of:
    accessing the stack trace to identify a module in the target program that called the exception-throwing module; and
    activating code-tracing at a medium detail level in that module.

3. A method according to claim 2, wherein the method comprises the further steps of:
    accessing the stack trace to identify a module in the target program that called the module that called the exception-throwing module; and
    activating code-tracing at a low detail level in that module that called the module that called the exception-throwing module.

4. A method according to claim 3, wherein the method comprises the further step of:
    activating code-tracing at a minimal detail level in the rest of the target program.

5. A method according to claim 1, wherein the method comprises the further steps of:
    identifying modules called by the exception-throwing module; and
    activating code-tracing at a medium detail level in those modules.

6. A method according to claim 5, wherein the step of identifying the called modules is implemented using a call identification module that analyses the exception module.

7. A method according to claim 1, wherein the method comprises the additional step of:
    accessing a code-tracing map that indicates what code-tracing settings should be activated if an exception occurs in a specified module.

8. A method of managing code-tracing data in a target program, the method comprises the steps of:
    identifying when an exception occurs in the target program;
    accessing a stack trace of a call stack to identify a module in the target program that threw the exception;
    assigning a level of code tracing in that module including activating code-tracing at a high detail level in that module; and
    decreasing the code-tracing levels over time if no exception is thrown.

9. A method of managing code-tracing data in a target program, the method comprises the steps of:
    identifying when an exception occurs in the target program;
    accessing a stack trace of a call stack to identify a module in the target program that threw the exception;
    assigning a level of code tracing in that module including activating code-tracing at a high detail level in that module; and
    increasing the code-tracing levels over time if an exception is thrown within a preset time period of restarting the target program.

10. A method of managing code-tracing data in a target program, the method comprises the steps of:
    identifying when an exception occurs in the target program;
    accessing a stack trace of a call stack to identify a module in the target program that threw the exception;
    activating code-tracing at a high detail level in that module; and
    returning the code-tracing levels to a default value after a time period expires with no exception being thrown.

11. A method of managing code-tracing data in a target program, the method comprises the steps of:
    identifying when an exception occurs in the target program;
    accessing a stack trace of a call stack to identify a module in the target program that threw the exception;
    activating code-tracing at a high detail level in that module; and
    decreasing the code-tracing levels over time if no exception is thrown.

12. A method of managing code-tracing data in a target program, the method comprises the steps of:
    identifying when an exception occurs in the target program;
    accessing a stack trace of a call stack to identify a module in the target program that threw the exception;
    activating code-tracing at a high detail level in that module; and
    increasing the code-tracing levels over time if an exception is thrown within a preset time period of restarting the target program.

* * * * *